(12) United States Patent
Iwase

(10) Patent No.: US 11,205,076 B2
(45) Date of Patent: Dec. 21, 2021

(54) APPARATUS FOR ALERTING BASED ON DETECTING OBJECTS APPROACHING EACH OTHER IN IMAGES, ALERTING METHOD, PROGRAM, AND NON-TRANSITORY COMPUTER-READABLE INFORMATION RECORDING MEDIUM

(71) Applicant: Rakuten Group, Inc., Tokyo (JP)

(72) Inventor: Hiroaki Iwase, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 0 days.

(21) Appl. No.: 16/638,787

(22) PCT Filed: Aug. 1, 2018

(86) PCT No.: PCT/JP2018/028875
§ 371 (c)(1),
(2) Date: Feb. 13, 2020

(87) PCT Pub. No.: WO2020/026381
PCT Pub. Date: Feb. 6, 2020

(65) Prior Publication Data
US 2021/0133446 A1    May 6, 2021

(51) Int. Cl.
*G06K 9/00* (2006.01)
*G06T 7/285* (2017.01)
*G06K 9/20* (2006.01)

(52) U.S. Cl.
CPC ..... *G06K 9/00671* (2013.01); *G06K 9/00201* (2013.01); *G06K 9/00718* (2013.01);
(Continued)

(58) Field of Classification Search
CPC ........... G06K 9/00671; G06K 9/00201; G06K 9/00718; G06K 2009/00738;
(Continued)

(56) References Cited

U.S. PATENT DOCUMENTS

| | | | |
|---|---|---|---|
| 2015/0298621 A1* | 10/2015 | Katoh | G08G 1/165 348/148 |
| 2016/0309134 A1 | 10/2016 | Venkataraman et al. | |
| 2016/0350973 A1* | 12/2016 | Shapira | G06F 3/017 |

FOREIGN PATENT DOCUMENTS

JP    2013-145525 A    7/2013

OTHER PUBLICATIONS

Alberto Rodriguez et al., "Assisting the Visually Impaired: Obstacle Detection and Warning System by Acoustic Feedback" Sensors, 2012, vol. 12, pp. 17476-17496 (21 pages total).
(Continued)

*Primary Examiner* — Casey L Kretzer
(74) *Attorney, Agent, or Firm* — Sughrue Mion, PLLC

(57) ABSTRACT

An alerting apparatus (100) includes an obtainer (111), a detector (112), and an outputter (113). The obtainer (111) obtains a group of images of a group of objects imaged by a stereo camera, the group of objects including a plurality of external objects. The detector (112) detects objects approaching each other in accordance with positions and parallaxes of the plurality of imaged objects based on the obtained group of images. The outputter (113) outputs an alert reflecting a degree of approach, the degree representing a degree of closeness between the detected objects.

7 Claims, 12 Drawing Sheets

(52) U.S. Cl.
CPC .... *G06T 7/285* (2017.01); *G06K 2009/00738* (2013.01); *G06K 2009/2045* (2013.01); *G06T 2207/10021* (2013.01)

(58) Field of Classification Search
CPC ............ G06K 2009/2045; G06T 7/285; G06T 2207/10021
See application file for complete search history.

(56) References Cited

OTHER PUBLICATIONS

Bernard Schmidt et al., "Depth camera based collision avoidance via active robot control" Journal of Manufacturing Systems, vol. 33 (2014), pp. 711-718 (8 pages total).

* cited by examiner

APPARATUS FOR ALERTING BASED ON DETECTING OBJECTS APPROACHING EACH OTHER IN IMAGES, ALERTING METHOD, PROGRAM, AND NON-TRANSITORY COMPUTER-READABLE INFORMATION RECORDING MEDIUM

CROSS REFERENCE TO RELATED APPLICATIONS

This application is a National Stage of International Application No. PCT/JP2018/028875, filed Aug. 1, 2018.

TECHNICAL FIELD

The present disclosure relates to an alerting apparatus, an alerting method, a program, and a non-transitory computer-readable information recording medium.

BACKGROUND ART

In order that at least one of a plurality of articles can be taken without collision using a manipulator or robot, conventional techniques are made available by which a three-dimensional image is generated from images taken by a stereo camera, the position or attitude of each article is identified by comparing the image with the three-dimensional model of each object, and, based on the identified position or attitude, it is determined whether the article can be taken without collision (see Patent Literature 1, for example).

CITATION LIST

Patent Literature

Patent Literature 1: Unexamined Japanese Patent Application Kokai Publication No. 2013-145525

SUMMARY OF INVENTION

Technical Problem

Meanwhile, in a virtual reality system that provides the user with a virtual space through a head-mounted display, the user wearing the head-mounted display is usually unable to visually identify the real space, and thus the user may hit against an object placed in the real space when, for example, the user moves the user' hand. Therefore, there is demand for a technique of alerting the user to a possible hitting in advance, taking movement of objects into consideration.

The present disclosure is intended to solve the aforementioned problems, and an objective of the present disclosure is to provide an alerting apparatus, an alerting method, a program, and a non-transitory computer-readable information recording medium for achieving detection of an object that is likely to hit against another object and issuing an alert to the user.

Solution to Problem

An alerting apparatus according to a first aspect of the present disclosure includes:

an obtainer that obtains a group of images of a group of objects imaged by a stereo camera, the group of objects including a plurality of external objects;

a detector that detects objects approaching each other in accordance with positions and parallaxes of the plurality of imaged objects based on the obtained group of images; and an outputter that outputs an alert reflecting a degree of approach, the degree representing a degree of closeness between the detected objects.

In the alerting apparatus according to the aforementioned aspect, the detector may extract a group of maintained objects that maintain relative positional relationships, in accordance with the positions and the parallaxes of the plurality of imaged objects, and in the obtained group of images, when a backward object hidden by a frontward object that is not included in the extracted group of maintained objects is included in the extracted group of maintained objects, the detector may determine whether the backward object and the frontward object are approaching each other, in accordance with the relative positional relationships.

In the alerting apparatus according to the aforementioned aspect, the obtainer may obtain the group of images including stereo images imaged by the stereo camera at a predetermined time interval, the detector may calculate, with respect to each of the stereo images included in the obtained group of images, distances among the plurality of objects and parallaxes of the individual objects in the each of the stereo images, and the detector may detect objects approaching each other, based on temporal change in the calculated distances and parallaxes.

In the alerting apparatus according to the aforementioned aspect, the outputter may output an alert object representing contours of the detected objects to a display.

An alerting method according to a second aspect of the present disclosure is executed by an alerting apparatus, the method including:

an obtaining step of obtaining a group of images of a group of objects imaged by a stereo camera, the group of objects including a plurality of external objects;

a detecting step of detecting objects approaching each other in accordance with positions and parallaxes of the plurality of imaged objects based on the obtained group of images; and an outputting step of outputting an alert reflecting a degree of approach, the degree representing a degree of closeness between the detected objects.

A program according to a third aspect of the present disclosure causes a computer to function as:

an obtainer that obtains a group of images of a group of objects imaged by a stereo camera, the group of objects including a plurality of external objects;

a detector that detects objects approaching each other in accordance with positions and parallaxes of the plurality of imaged objects based on the obtained group of images; and an outputter that outputs an alert reflecting a degree of approach, the degree representing a degree of closeness between the detected objects.

A non-transitory computer-readable information recording medium according to a fourth aspect of the present disclosure stores a program causing causes a computer to function as:

an obtainer that obtains a group of images of a group of objects imaged by a stereo camera, the group of objects including a plurality of external objects;

a detector that detects objects approaching each other in accordance with positions and parallaxes of the plurality of imaged objects based on the obtained group of images; and an outputter that outputs an alert reflecting a degree of approach, the degree representing a degree of closeness between the detected objects.

Note that the aforementioned information recording medium can be distributed or sold independently of computers. The non-transitory information recording medium as used herein refers to a tangible information recording medium. Examples of the non-transitory information recording medium include a compact disk, a flexible disk, a hard disk, a magnetic disk, a digital video disk, a magnetic tape, and a semiconductor memory. A transitory information recording medium refers to a transmission medium (a propagated signal) itself. Examples of the transitory recording medium include an electronic signal, an optical signal, and an electromagnetic wave. A temporary storage area is an area for temporarily storing data and programs, and is a volatile memory such as a random access memory (RAM).

Advantageous Effects of Invention

The present disclosure makes it possible to detect objects that are likely to hit against each other to issue an alert to the user.

DESCRIPTION OF EMBODIMENTS

Figure 1:
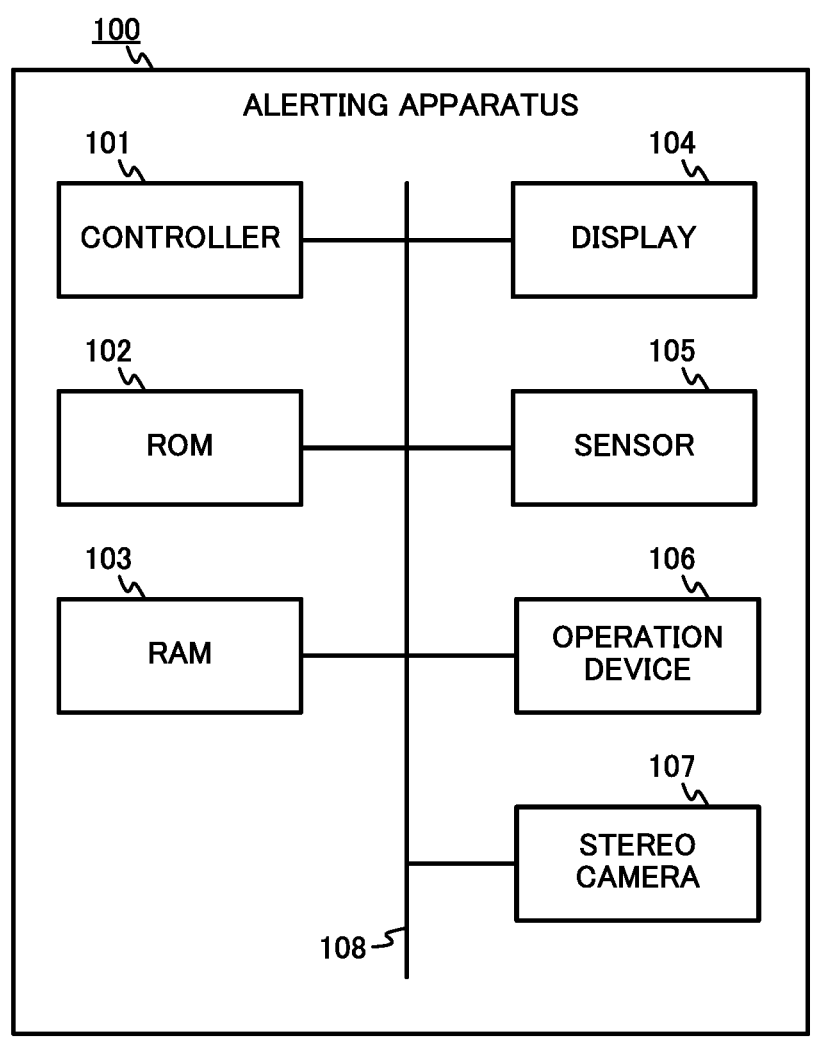
FIG. 1 is a schematic block diagram illustrating a hardware configuration of an alerting apparatus according to an embodiment.

An embodiment of the present disclosure will now be described. The embodiment is presented for explanatory purposes only and do not limit the scope of the present disclosure. Accordingly, persons skilled in the art can adopt an embodiment in which any or all of the elements in the following embodiment are replaced with equivalents thereof, and such adopted embodiments are included in the scope of the present disclosure. For explaining the embodiment of the present disclosure referring to the drawings, identical reference symbols are given to identical or equivalent parts throughout the drawings.

FIG. 1 is a schematic block diagram illustrating a hardware configuration of an alerting apparatus 100 according to the present embodiment. The alerting apparatus 100 includes, for example, a head-mounted display that has various types of sensors and a control device. The head-mounted display may be built by mounting a smart phone, a tablet computer, a phablet, or the like onto an attachment. In this case, the alerting apparatus 100 is implemented by executing a program causing a computer such as a smart phone to function as the aforementioned components on the computer such as a smart phone. As illustrated in FIG. 1, the alerting apparatus 100 includes a controller 101, a read-only memory (ROM) 102, a RAM 103, a display 104, a sensor 105, an operation device 106, and a stereo camera 107, which are connected by a bus 108.

The controller 101, which includes, for example, a central processing unit (CPU), controls the alerting apparatus 100 as a whole.

The ROM 102 is a non-volatile memory storing programs and various types of data needed for the controller 101 to control the alerting apparatus 100 as a whole.

The RAM 103 is a volatile memory for temporarily storing information generated by the controller 101 and data needed for generating the information.

The display 104, which includes a liquid crystal display (LCD), a backlight, and so on, is under control of the controller 101 to show, for example, an image output by the controller 101.

The sensor 105, which may include an attitude sensor and an acceleration sensor, detects the orientation of the alerting apparatus 100. The sensor 105 outputs a signal indicating the detected orientation of the alerting apparatus 100 to the controller 101.

The operation device 106 includes an input device such as a button, a keyboard, and a touch panel. The operation device 106 accepts operations input by the user of the alerting apparatus 100 and outputs signals corresponding to the accepted input operations to the controller 101.

Figure 2:
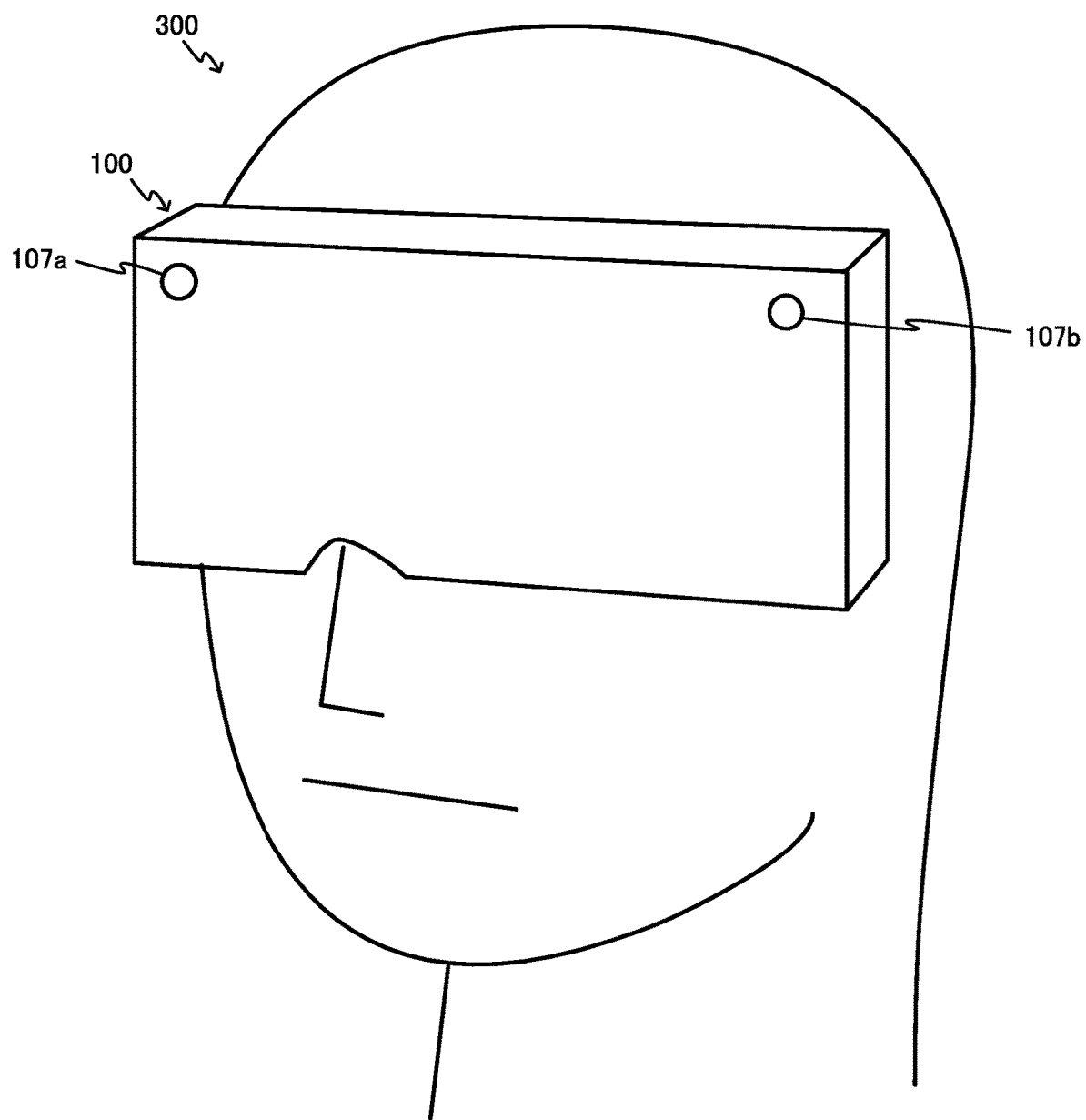
FIG. 2 is an external view of the alerting apparatus worn by a user according to the embodiment.

The stereo camera 107 includes two cameras each including a lens and an imaging element such as a charge-coupled device (CCD) image sensor or a complementary metal-oxide-semiconductor (CMOS) image sensor. As illustrated in FIG. 2, the stereo camera 107 according to the present embodiment includes a right camera 107a and a left camera 107b, the right camera 107a being disposed on the right-hand end as seen from the user 300 on the front of the alerting apparatus 100, the left camera 107b being disposed on the left-hand end as seen from the user 300. The stereo camera 107 takes images of a group of objects 400 as described later.

Figure 3:
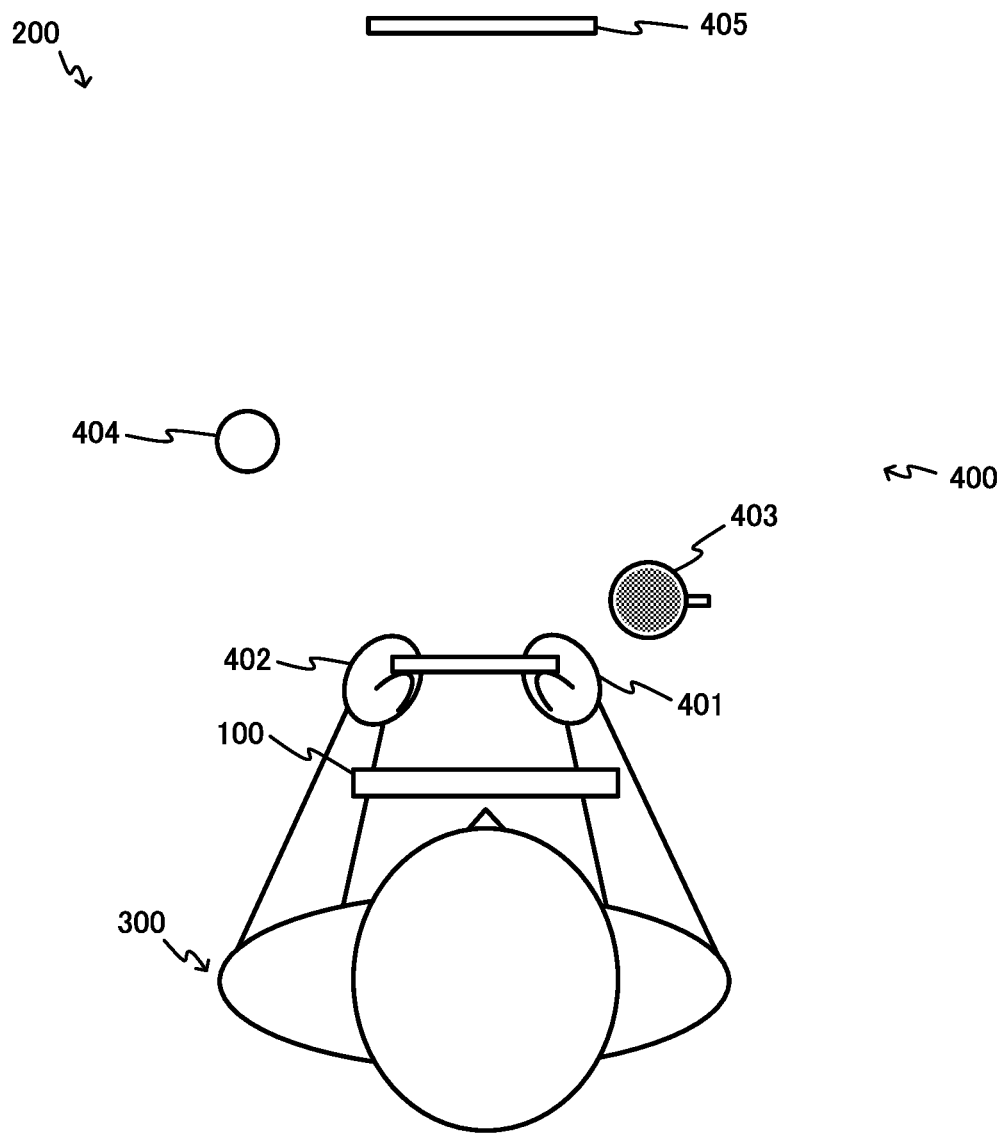
FIG. 3 is a top view of the alerting apparatus, the user, and a group of objects present in a real space.

The following describes a positional relationship in the real space among the alerting apparatus 100, the user 300, and the group of objects 400 according to the present embodiment. FIG. 3 is a top view of the alerting apparatus 100, the user 300, and the group of objects 400 present in the real space 200. As shown in FIG. 3, the group of objects 400 made up of objects 401 to 405 are positioned in front of the user 300 in the real space 200. The objects 401 to 405 are positioned outside the alerting apparatus 100 and are movable independently of movement of the alerting apparatus 100. In the present embodiment, the objects 401 to 405 are the right hand of the user 300, the left hand of the user 300, a cup, a can, and a painting, respectively. Note that the objects 401 and 402 can be moved by the user at will while the objects 403 to 405 are stationary. Note that the objects 401 to 405 according to the present embodiment are non-limiting examples of a plurality of objects according to the present disclosure. As described later, any object may be used as one of the plurality of objects according to the present disclosure, as long as the object can be recognized in an image taken by the stereo camera 107.

Figure 4:
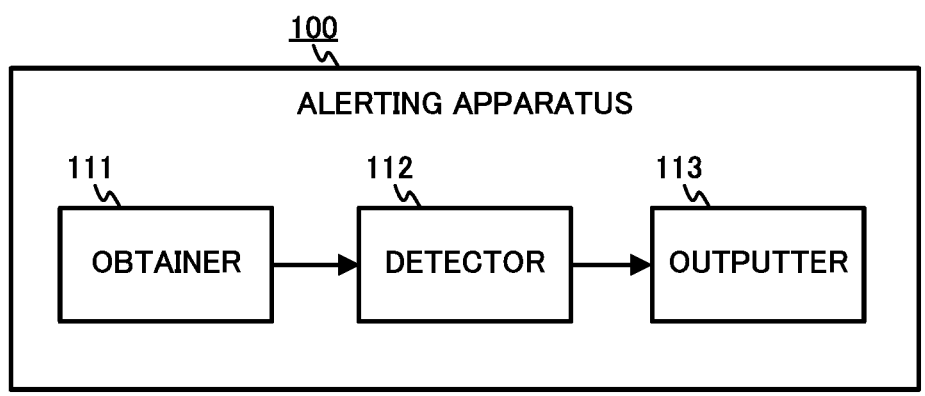
FIG. 4 is a schematic block diagram illustrating a functional configuration of the alerting apparatus according to the embodiment.

FIG. 4 is a schematic block diagram illustrating a functional configuration of the alerting apparatus 100 according to the embodiment of the present disclosure. As illustrated in FIG. 4, the alerting apparatus 100 includes an obtainer 111, a detector 112, and an outputter 113. These functions are implemented by the controller 101 executing a program recorded in the ROM 102 and collaborating with the other components of the alerting apparatus 100.

The obtainer 111 obtains a group of images of the group of objects 400 taken by the stereo camera 107. The group of images is a group of images taken by the stereo camera 107 at predetermined time intervals. For example, the obtainer 111 obtains a single stereo image at time $t=t_1$, that is, a right image taken at time $t=t_1$ by the right camera 107a of the stereo camera 107 and a left image taken at time $t=t_1$ by the left camera 107b. In addition, the obtainer 111 obtains a single stereo image at time $t=t_2$, which is the time later than $t=t_1$ by a predetermined time $\Delta t$, that is, a right image taken by the right camera 107a at time $t=t_2$ and a left image taken by the left camera 107b at time $t=t_2$. In this way, the obtainer 111 obtains the group of images, which is a group of stereo images taken by the stereo camera 107 at a predetermined interval of $\Delta t$.

In the present embodiment, the controller 101 and the stereo camera 107 collaborate with each other to function as the obtainer 111.

The detector 112 detects objects approaching each other, in accordance with the positions and parallaxes of the imaged objects 401 to 405 as identified from the group of images obtained by the obtainer 111.

The following describes an example of a method for detecting approaching objects. First, the detector 112 identifies the positions of the objects 401 to 405 appearing in the stereo image taken at a certain time, $t=t_1$, among the group of images obtained by the obtainer 111. Specifically, the detector 112 compares the stereo image with a pattern of shapes, markings, colors, and the like of the objects 401 to 405 recorded in the ROM 102 in advance, and identifies the positions of the objects 401 to 405 through image recognition. As an example of the positions of the objects 401 to 405 in the stereo image, a representative point, such as a center point, in each of the objects 401 to 405 in the stereo image may be used. Next, on the basis of the identified positions of the objects 401 to 405 in the stereo image, the detector 112 calculates distances among the objects 401 to 405 in the stereo image. In addition, on the basis of the right image and left image included in the stereo image, the detector 112 calculates parallaxes of the individual objects 401 to 405. The parallax as used herein refers to each of the differences (distances) between the positions of the objects 401 to 405 in the right image and the positions of the objects 401 to 405 in the left image.

Figure 5A:
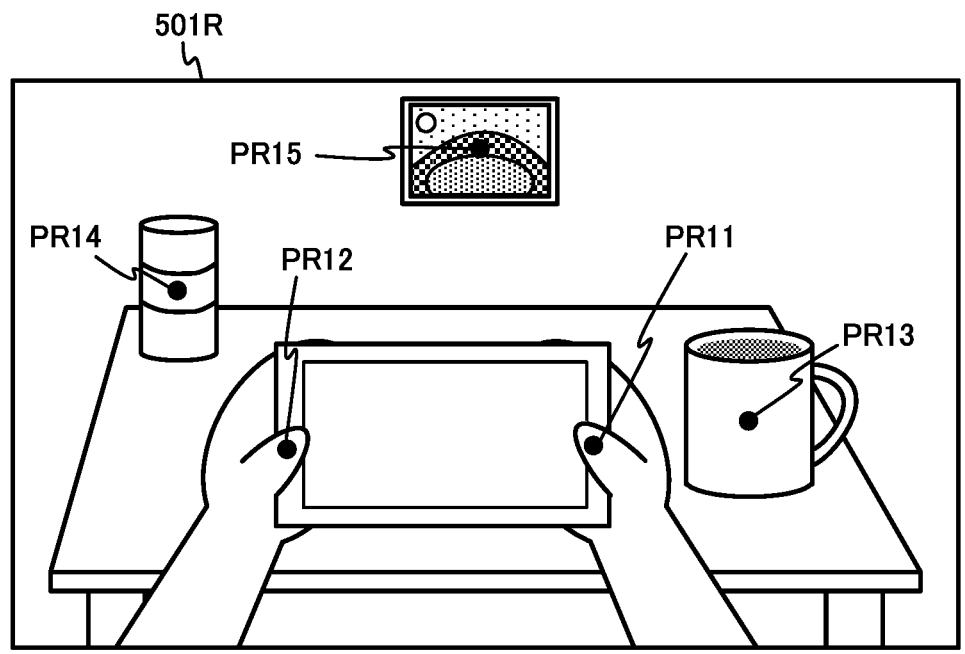
FIG. 5A is a right image taken by a stereo camera at time $t=t_1$.
Figure 5B:
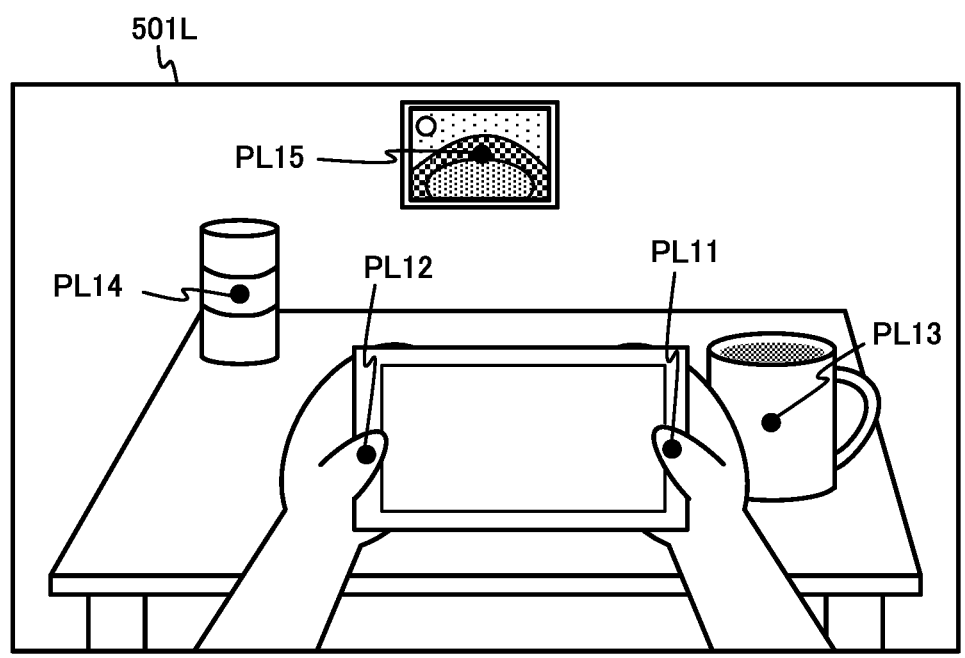
FIG. 5B is a left image taken by the stereo camera at time $t=t_1$.

By way of example, it is assumed that the obtainer 111 has obtained the right image 501R taken at time $t=t_1$ as illustrated in FIG. 5A and the left image 50IL taken at time $t=t_1$ as illustrated in FIG. 5B. Then, the detector 112 identifies the positions PR11 to PR15 of the objects 401 to 405 in the right image 501R and the positions PL11 to PL15 of the objects 401 to 405 in the left image 50IL. After that, the detector 112 calculates distances among the objects 401 to 405 in the right image 501R on the basis of the positions PR11 to PR15. Likewise, the detector 112 calculates distances among the objects 401 to 405 in the left image 50IL on the basis of the positions PL11 to PL15. Furthermore, the detector 112 calculates parallaxes of the individual objects 401 to 405 from differences between the positions PR11 to PR15 in the right image 501R and the positions PL11 to PL15 in the left image 50IL with respect to each of the objects 401 to 405.

For each one of stereo images obtained by the obtainer 111 at predetermined time intervals, the detector 112 calculates distances among the individual objects 401 to 405 in the right image, distances among the individual objects 401 to 405 in the left image, and parallaxes of the individual objects 401 to 405, as described above. On the basis of temporal changes in the distances among the individual objects 401 to 405 in the right image, the distances among the individual objects 401 to 405 in the left image, and the parallaxes of the individual objects 401 to 405, the detector 112 detects any two approaching objects, designated as object A and object B, which satisfy the following conditions (1) to (3):

(1) The distance between the object A and the object B in the right image has been shortened;

(2) The distance between the object A and the object B in the left image has been shortened; and (3) The difference between the parallax of the object A and the parallax of the object B has become smaller.

In other words, by using the conditions (1) and (2), the detector 112 determines whether the objects 401 to 405 are approaching one another on a plane orthogonal to the shooting direction (in front of the user) of the stereo camera 107. In addition, by using the condition (3), the detector 112 determines whether the objects 401 to 405 are approaching one another along the shooting direction of the stereo camera 107. Thus, when any two of the objects 401 to 405 satisfy the conditions (1) to (3), the detector 112 detects these two objects as the objects approaching each other in the real space 200.

Figure 6:
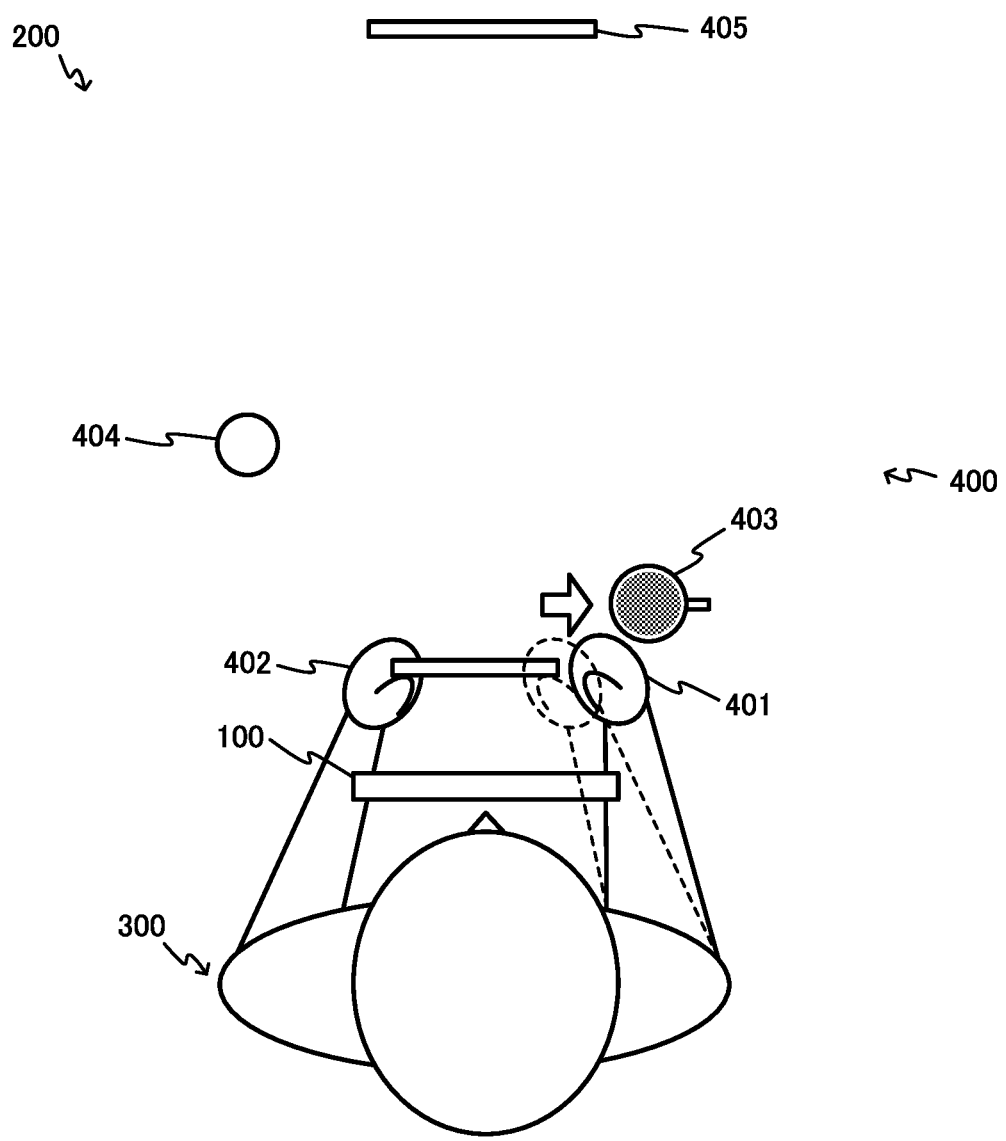
FIG. 6 is a top view of the alerting apparatus, the user, and the group of objects present in the real space at time $t=t_2$.
Figure 7A:
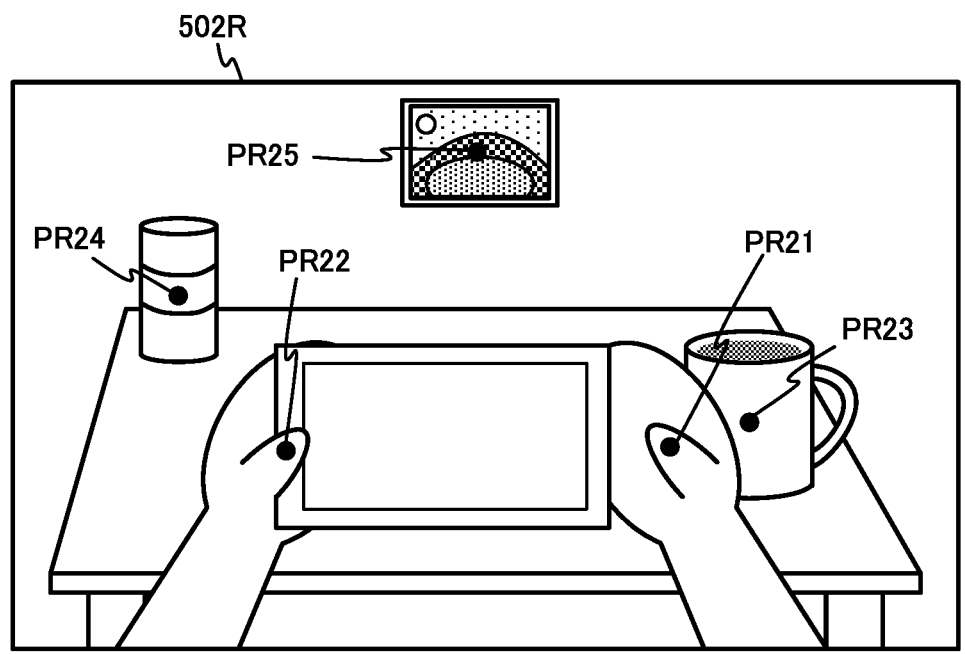
FIG. 7A is a right image taken by the stereo camera at time $t=t_2$.
Figure 7B:
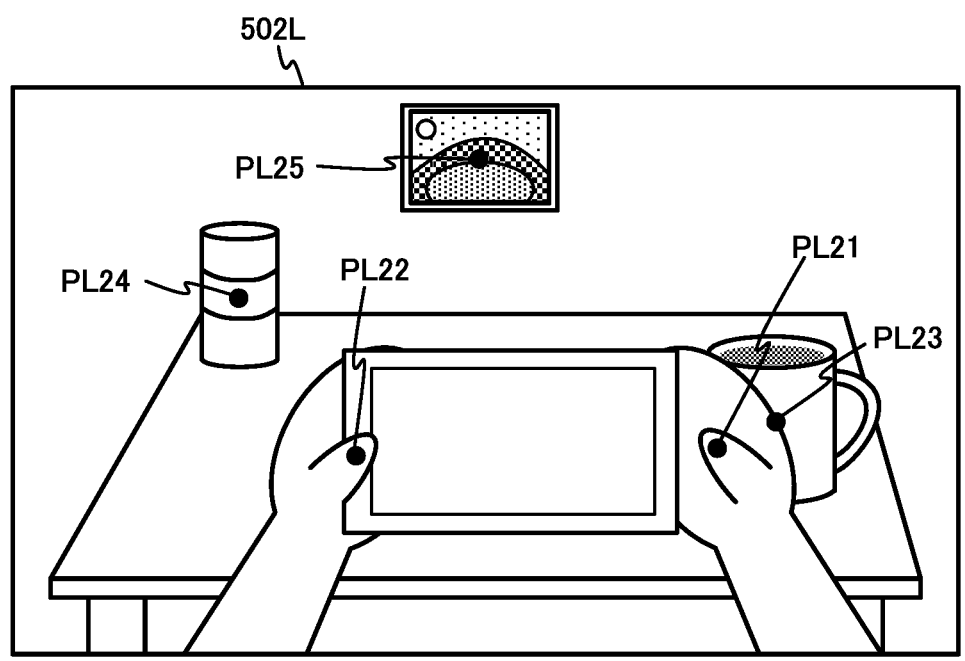
FIG. 7B is a left image taken by the stereo camera at time $t=t_2$.

By way of example, it is assumed that the object 401 positioned as shown in FIG. 3 at time $t=t_1$ has been moved to the right and is placed at the position as shown in FIG. 6 at time $t=t_2$. It is further assumed that the obtainer 111 has obtained, at time $t=t_2$, which is later than time $t=t_1$ by a predetermined time $\Delta t$, a stereo image including the right image 502R in FIG. 7A and the left image 502L in FIG. 7B. Then, the detector 112 identifies the positions PR21 to PR25 of the individual objects 401 to 405 in the right image 502R as shown in FIG. 7A and the positions PL21 to PL25 of the individual objects 401 to 405 in the left image 502L as shown in FIG. 7B. The detector 112 calculates distances among the objects 401 to 405 in the right image 502R on the basis of the positions PR21 to PR25, and calculates distances among the objects 401 to 405 in the left image 502L on the basis of the positions PL21 to PL25. Furthermore, the detector 112 calculates parallaxes of the individual objects 401 to 405 from differences between the positions PR21 to PR25 in the right image 502R and the positions PL21 to PL25 in the left image 502L with respect to each of the objects 401 to 405. The detector 112 then determines that the distance between the object 401 and the object 403 at $t=t_2$ in the right image 502R (the distance between the position PR21 and the position PR23 in FIG. 7A) is shorter than the distance between the object 401 and the object 403 at t=t$_1$ in the right image 501R (the distance between the position PR11 and the position PR13 in FIG. 5A), and determines that the objects 401 and 403 satisfy the condition (1). The detector 112 determines that the distance between the object 401 and the object 403 at t=t$_2$ in the left image 502L (the distance between the position PL21 and the position PL23 in FIG. 7B) is shorter than the distance between the object 401 and the object 403 at t=t$_1$ in the left image 501L (the distance between the position PL11 and the position PL13 in FIG. 5B), and determines that the objects 401 and 403 satisfy the condition (2). The detector 112 determines that the difference between the parallax of the object 401 at t=t$_2$ (the distance between the position PR21 in FIG. 7A and the position PL21 in FIG. 7B) and the parallax of the object 403 (the distance between the position PR23 in FIG. 7A and the position PL23 in FIG. 7B) is smaller than the difference between the parallax of the object 401 at t=t$_1$ (the distance between the position PR11 in FIG. 5A and the position PL11 in FIG. 5B) and the parallax of the object 403 (the distance between the position PR13 in FIG. 5A and the position PL13 in FIG. 5B), and determines that the objects 401 and 403 satisfy the condition (3). Since the objects 401 and 403 satisfy the conditions (1) to (3), the detector 112 detects the objects 401 and 403 as the objects approaching each other in the real space 200.

In the present embodiment, the controller 101 functions as the detector 112.

The outputter 113 outputs an alert that reflects the degree of approach of the objects to each other as detected by the detector 112. The degree of approach as used herein refers to the degree of closeness between objects.

The following describes an example of a method for calculating the degree of approach of the objects to each other as detected by the detector 112. For example, the outputter 113 can calculate the degree of approach A in accordance with the equation below using DR, DL, and X, where DR is the distance in the right image between the objects detected by the detector 112, DL is the distance in the left image between the objects detected by the detector 112, and X is the difference between parallaxes of the objects detected by the detector 112:

$$A=1/(\alpha DR^2+\beta DL^2+\gamma X^2) \text{ ($\alpha$, $\beta$, and $\gamma$ are any positive coefficients)}$$

When the calculated degree of approach is greater than a predetermined threshold, the outputter 113 determines that the objects detected by the detector 112 are likely to hit against each other and outputs an alert to the display 104.

Figure 8A:
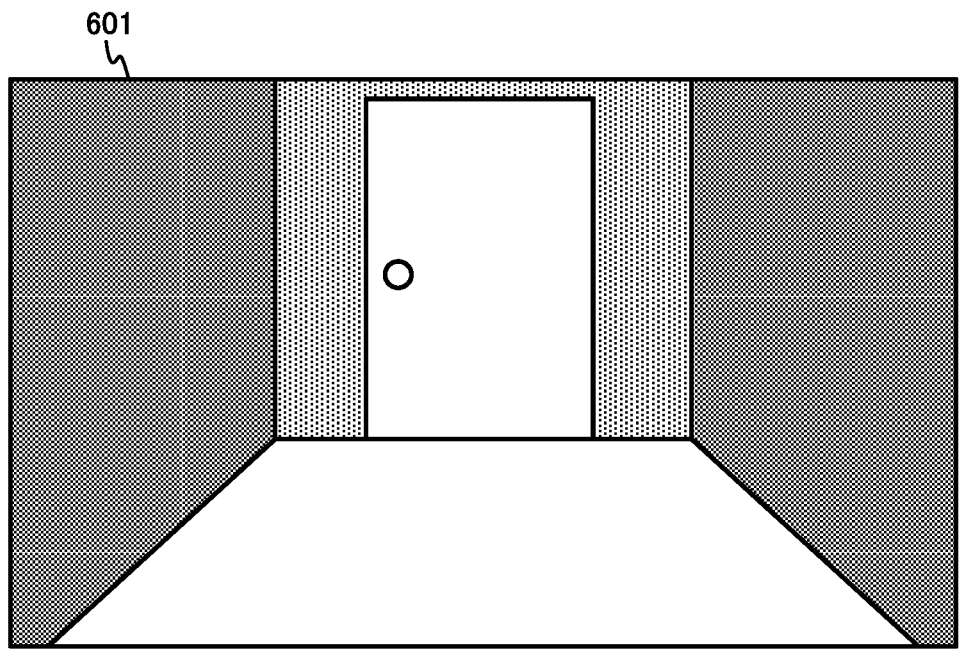
FIG. 8A is an image of a virtual space shown on a display at time $t=t_1$.

The following describes an example of an alert output by the outputter 113. FIG. 8A is an example image shown on the display 104 at time t=t$_1$ by the outputter 113. In the present embodiment, in response to an orientation of the alerting apparatus 100 as detected by the sensor 105 or an input from the user 300 as accepted by the operation device 106, the outputter 113 changes the observation position and the observation direction in the virtual space to generate an image of the virtual space seen from the observation position in the observation direction, and outputs the image to the display 104. At time t=t$_1$, the detector 112 determines that none of the objects 401 to 405 satisfies the conditions (1) to (3), and the outputter 113 shows on the display 104 an image 601 of the virtual space without any alert.

Figure 8B:
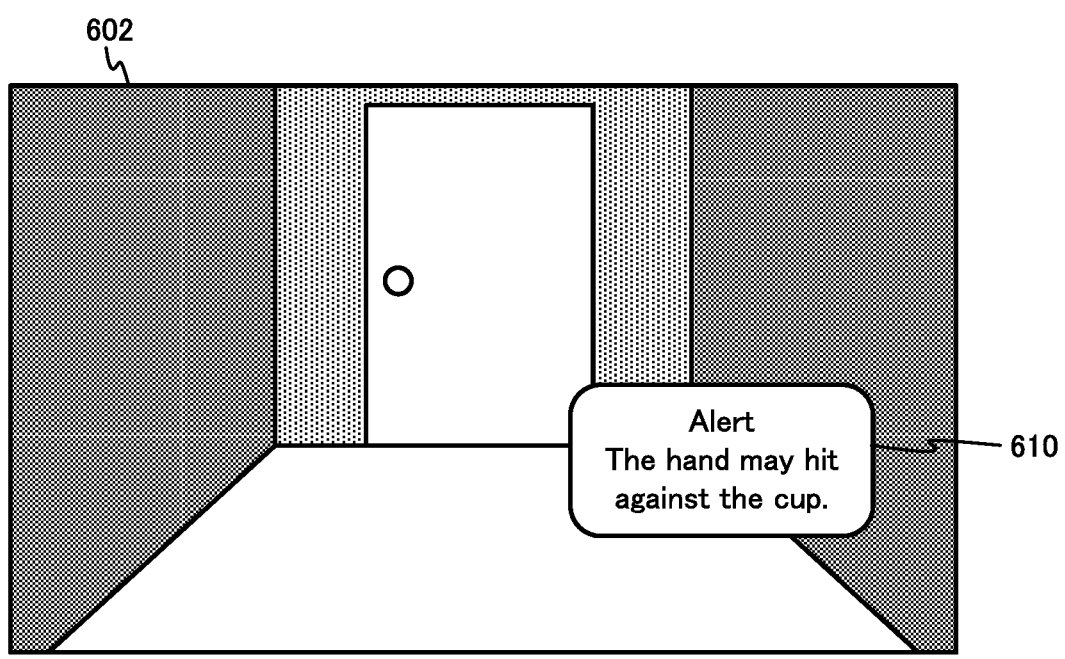
FIG. 8B is an image of the virtual space shown on the display at time $t=t_2$.

FIG. 8B is an example image shown on the display 104 at time t=t$_2$ by the outputter 113. At time t=t$_2$, when the detector 112 determines that the objects 401 and 403 satisfy the conditions (1) to (3), and the outputter 113 determines that the degree of approach of the objects 401 and 403 is greater than a predetermined threshold, the outputter 113 shows on the display 104, as illustrated in FIG. 8B, an image 602 of the virtual space with an alert object 610 appearing at a position corresponding to the object 401 or the object 403. The alert object 610 is an object alerting the user 300 that the objects 401 and 403 are likely to hit. In the example illustrated in FIG. 8B, the alert object 610 includes the messages "Alert" and "The hand may hit against the cup." The outputter 113 continuously displays the alert object 610 until the degree of approach of the objects 401 and 403 falls below the predetermined threshold.

In the present embodiment, the controller 101 and the display 104 collaborate with each other to function as the outputter 113.

Figure 9:
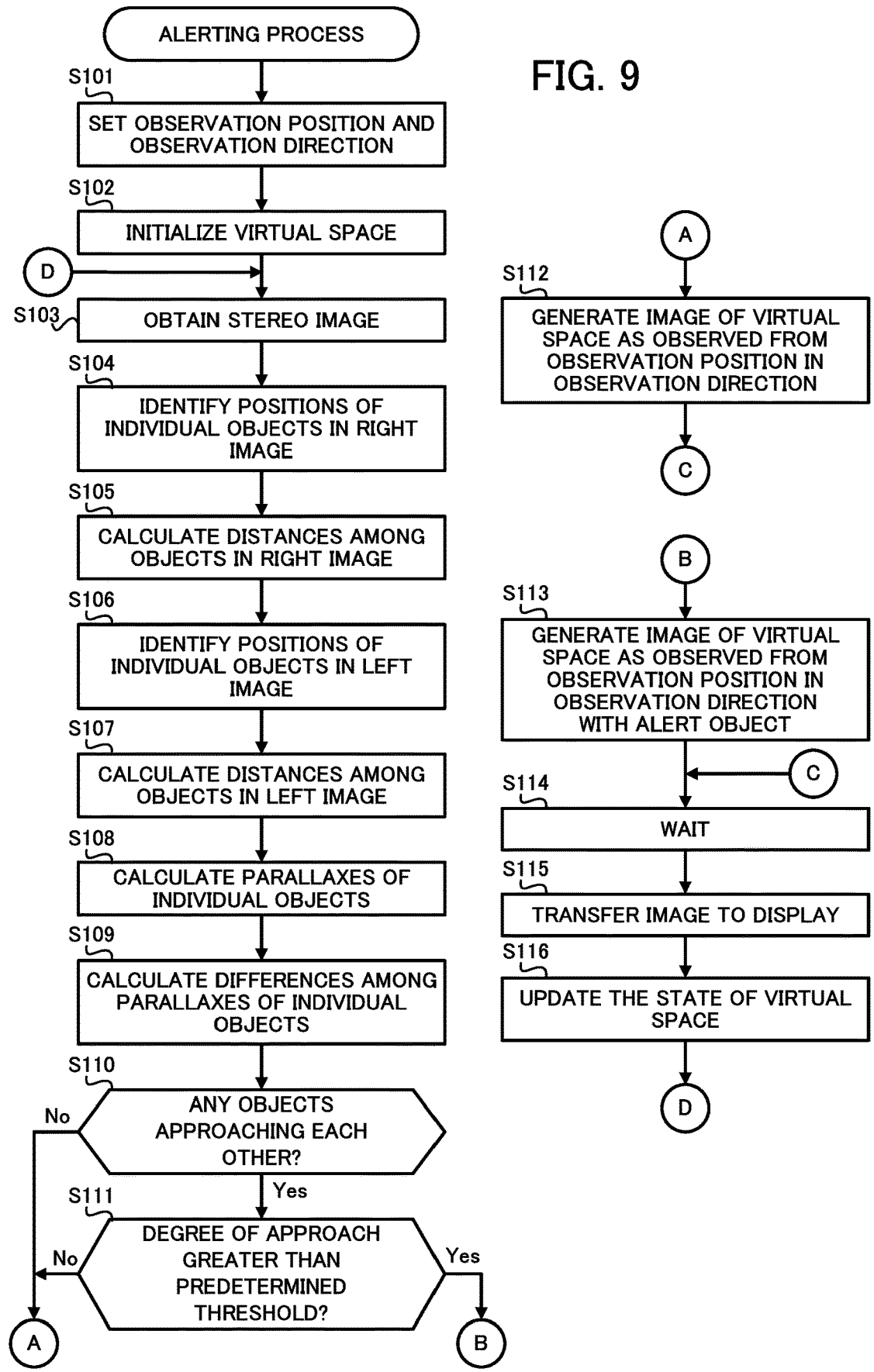
FIG. 9 is a flowchart illustrating a flow of an alerting process executed by a controller in the alerting apparatus according to the embodiment.

The following describes operations of the alerting apparatus 100 according to the embodiment of the present disclosure. FIG. 9 is a flowchart illustrating a flow of an alerting process executed by the controller 101 in the alerting apparatus 100. Start of the process is triggered by, for example, acceptance of an instruction to start the process via the operation device 106.

First, the alerting apparatus 100 initializes the observation position and the observation direction in the virtual space to a predetermined position and direction (step S101).

Next, the alerting apparatus 100 initializes the virtual space (step S102). During the initialization, the alerting apparatus 100 makes settings for the virtual space, including, for example, obtaining and setting the position, shape, orientation, and appearance of an object to be placed in the virtual space, and obtaining and setting an image of the background supposed to be placed at an infinite distance in the virtual space.

Next, the alerting apparatus 100 obtains a stereo image from the stereo camera 107 (step S103).

On the basis of the right image included in the stereo image that has been obtained in step S103, the alerting apparatus 100 identifies the positions of individual objects 401 to 405 in the right image (step S104).

Then, on the basis of the positions of the individual objects 401 to 405 in the right image as identified in step S104, the alerting apparatus 100 calculates distances among the individual objects in the right image (step S105).

Likewise, on the basis of the left image included in the stereo image that has been obtained in step S103, the alerting apparatus 100 identifies the positions of the individual objects 401 to 405 in the left image (step S106).

Then, on the basis of the positions of the individual objects 401 to 405 in the left image as identified in step S106, the alerting apparatus 100 calculates distances among the individual objects in the left image (step S107).

On the basis of the stereo image obtained in step S103, the alerting apparatus 100 calculates the parallaxes of the individual objects (step S108).

On the basis of the parallaxes of the individual objects as calculated in step S108, the alerting apparatus 100 calculates differences among the parallaxes of the individual objects (step S109).

The alerting apparatus 100 then compares the distances among the individual objects in the right image, the distances among the individual objects in the left image, and the differences among the parallaxes of the individual objects, which have just been calculated, with the distances among the individual objects in the right image, the distances among the individual objects in the left image, and the differences among the parallaxes of the individual objects, which were last calculated, and determines whether any two objects that satisfy the conditions (1) to (3) exist, that is, whether any two objects that are approaching each other exist (step S110).

When the alerting apparatus 100 determines that there exist two objects approaching each other (Yes in step S110), the alerting apparatus 100 calculates the degree of approach and determines whether the degree of approach is greater than a predetermined threshold (step S111).

When the alerting apparatus 100 determines that no object is approaching another object (No in step S110) or that the degree of approach is equal to or less than the predetermined threshold (No in step S111), the alerting apparatus 100 generates an image of the virtual space as observed from the current observation position in the observation direction (step S112). The alerting apparatus 100 moves the processing to step S114.

When the alerting apparatus 100 determines that the degree of approach is greater than the predetermined threshold (Yes in step S111), the alerting apparatus 100 generates an image of the virtual space as observed from the current observation position in the observation direction with an alert object appearing at a position corresponding to the position at which the objects approaching each other are present (step S113).

After that, the alerting apparatus 100 waits until a vertical synchronization interrupt occurs on the display 104 (step S114), and then transfers the generated image to, and shows the image on, the display 104 (step S115).

The alerting apparatus 100 then updates the state of the virtual space (step S116). For example, in cases where the virtual space is created by computer graphics that change with time, the alerting apparatus 100 conducts a physical simulation by which the position and orientation of an object in the virtual space are updated in accordance with the velocity, acceleration, angular velocity, angular acceleration, and the like that are set to the object, or deforms an object in accordance with predetermined conditions.

The alerting apparatus 100 then returns to the processing in step S103. The alerting apparatus 100 repeats the foregoing process until, for example, an instruction to exit the process is accepted via the operation device 106. Since the alerting apparatus 100 waits in step S114, the cycle period for this process is a vertical synchronization period.

As described above, on the basis of a group of images of the group of objects 400 taken by the stereo camera 107, the alerting apparatus 100 according to the embodiment of the present disclosure detects objects approaching each other, in accordance with the positions and parallaxes of the imaged objects 401 to 405. The alerting apparatus 100 outputs an alert that reflects the degree of approach of the detected objects. Thus, the alerting apparatus 100 can detect objects that are likely to hit against each other and issue an alert to the user.

On the basis of a group of images taken by the stereo camera 107, the alerting apparatus 100 according to the embodiment of the present disclosure compares, in time series, distances among the individual objects 401 to 405 in a right image, distances among the individual objects 401 to 405 in a left image, and differences among parallaxes of the objects 401 to 405 to determine whether any objects are approaching each other. Therefore, faster processing is achieved compared with the cases where it is determined whether objects are likely to hit by generating a three-dimensional image from the images taken by the stereo camera 107 to identify the positions and attitudes of the objects 401 to 405 in the real space.

The embodiment of the present disclosure has been described above, but the embodiment is only an example and the scope of present disclosure is not limited thereto. In other words, the present disclosure allows for various applications and every possible embodiment is included in the scope of the present disclosure.

For example, in the example described in the foregoing embodiment, the alerting apparatus 100 outputs an alert reflecting the degree of approach with respect to every pair of objects that are approaching each other, but the alerting apparatus 100 may not necessarily output an alert with respect to every pair of objects that are approaching each other. For example, when the right hand and left hand of the user 300 are approaching each other, the alerting apparatus 100 may not necessarily issue an alert because no hazard is posed by the hands hitting against each other. The following describes an example of a method for determining whether objects are approaching each other except those objects which require no alert according to a modified example.

First, on the basis of a group of images taken by the stereo camera 107 as in the foregoing embodiment, the detector 112 extracts a group of maintained objects that maintain a relative positional relationship, in accordance with the positions and parallaxes of the imaged objects 401 to 405.

For example, the detector 112 identifies the positions of the objects 401 to 405 in a stereo image, as in the foregoing embodiment. In addition, on the basis of the right image and left image included in the stereo image, the detector 112 calculates parallaxes of the individual objects 401 to 405. The detector 112 then identifies the object 405, which has the smallest parallax over a most recent predetermined period of time, as a reference object for defining relative positional relationships for each of the objects 401 to 405. Specifically, as seen in FIGS. 3 and 6, the object 405 is the most distant object from the alerting apparatus 100 among the objects 401 to 405, and thus the object 405 has a smaller parallax than the other objects 401 to 404. Therefore, the positions of the individual objects 401 to 404 relative to the object 405 can be identified as relative positional relationships of the individual objects 401 to 405.

Next, from the objects 401 to 405, the detector 112 extracts an object having a smaller temporal change in the relative positional relationship over a most recent predetermined period of time than a predetermined threshold, as an object included in the group of maintained objects. For example, supposing that the object 401 has been moved in the most recent predetermined period of time as illustrated in FIG. 6, it is determined that the objects 402 to 405 remain stationary and their temporal changes in relative positional relationships are smaller than a predetermined threshold. Thus, the objects 402 to 405 are included in the group of maintained objects. By contrast, because the object 401 has been moved, its temporal change in a relative positional relationship is determined to be greater than the predetermined threshold. Thus, the object 401 is not included in the group of maintained objects.

Among an obtained group of images, if a backward object hidden by a frontward object that is not included in the extracted group of maintained objects is included in the extracted group of maintained objects, the detector 112 determines whether the backward object and the frontward object are approaching each other, in accordance with the relative positional relationships.

For example, regarding a group of images taken in a most recent predetermined period of time, the detector 112 determines whether the object 401, which is not included in the extracted group of maintained objects, is hiding any of the objects 402 to 405, which are included in the group of maintained objects. Whether an object is hiding another object can be determined by, for example, comparing patterns of the objects 401 to 405 pre-recorded in the ROM 102 with the group of images to find out whether an object and another object in an image are positioned close to each other according to predetermined criteria and whether the area showing the other object in an image is partly cut off in comparison with the corresponding pattern. When it is determined that the object 401 is hiding the object 403, the detector 112 determines whether the object 401 and the object 403 are approaching each other on the basis of whether these objects satisfy the conditions (1) to (3) as in the foregoing embodiment.

Figure 10:
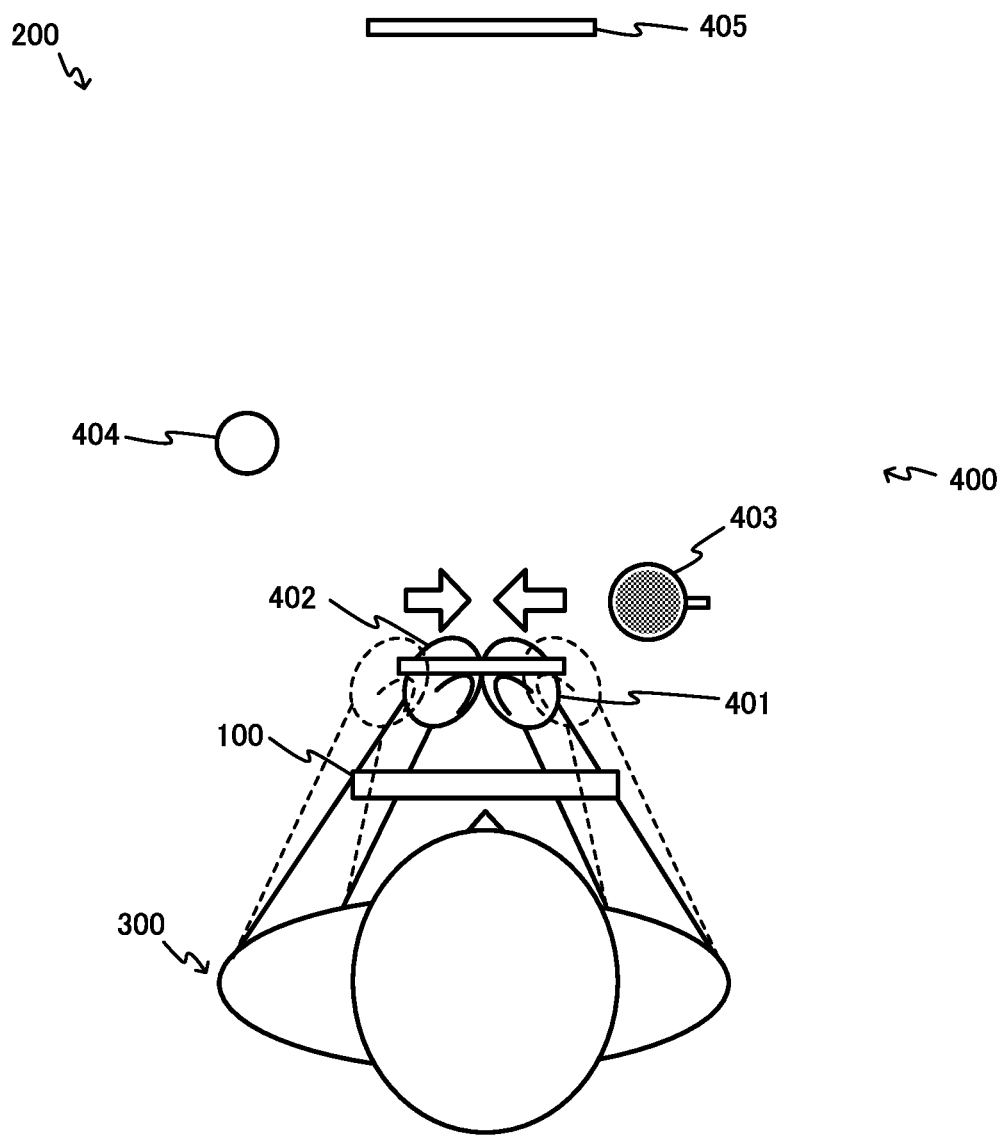
FIG. 10 is a top view of the alerting apparatus, the user, and the group of objects present in the real space at time $t=t_3$.
Figure 11A:
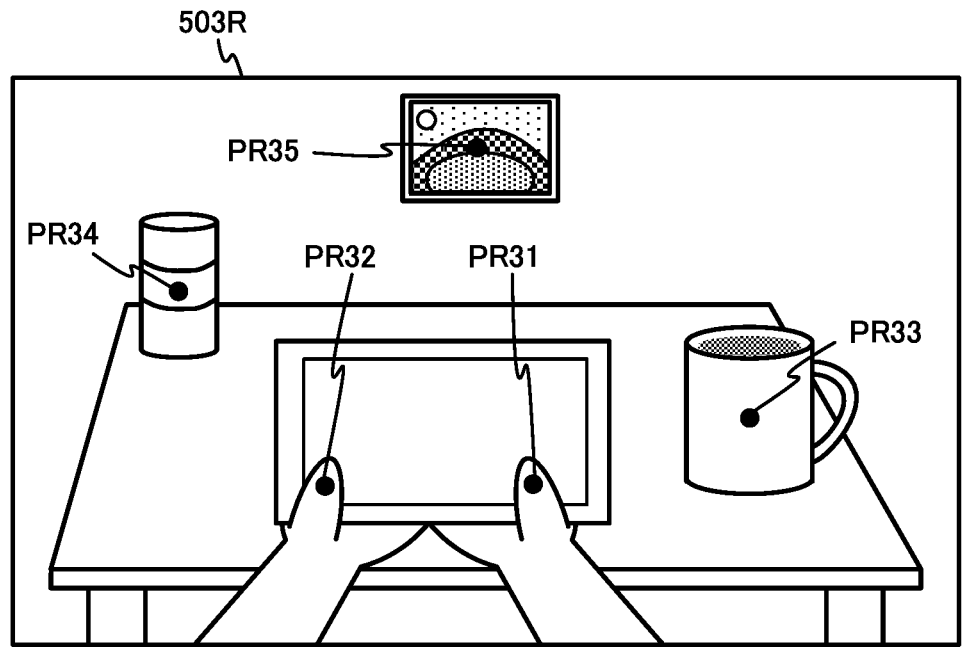
FIG. 11A is a right image taken by the stereo camera at time $t=t_3$.
Figure 11B:
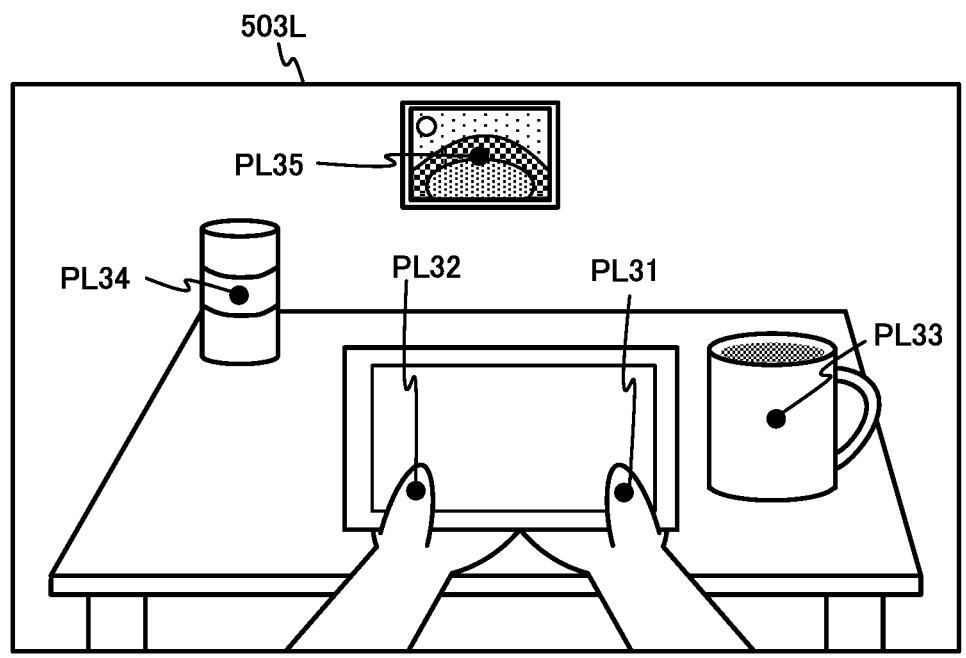
FIG. 11B is a left image taken by the stereo camera at time $t=t_3$.

As another example, suppose that the objects 401 and 402 are moved at time $t=t_3$ as illustrated in FIG. 10 and that a stereo image including a right image 503R and a left image 503L shown in FIGS. 11A and 11B has been obtained. The detector 112 identifies the positions PR31 to PR35 of the individual objects 401 to 405 in the right image 503R as shown in FIG. 11A and the positions PL31 to PL35 of the individual objects 401 to 405 in the left image 503L as shown in FIG. 11B. In this case, it is determined that the objects 403 to 405 remain stationary over a most recent predetermined period of time including time $t=t_3$ and their temporal changes in relative positional relationships are smaller than a predetermined threshold. Thus, the objects 403 to 405 are included in the group of maintained objects. By contrast, because the objects 401 and 402 have been moved, their temporal changes in relative positional relationships are determined to be greater than the predetermined threshold. Thus, neither of the objects 401 and 402 is included in the group of maintained objects. Accordingly, the objects 401 and 402 are excluded from the group of maintained objects and thus are not subject to determination whether the objects 401 and 402 are approaching each other, even when the object 401 is hiding the object 402 or the object 402 is hiding the object 401. Therefore, no alert is issued when the objects 401 and 402 approach each other.

In the example described in the embodiment above, the outputter 113 calculates the degree of approach using the distance in a right image between objects detected by the detector 112, the distance in a left image between objects detected by the detector 112, and the difference between parallaxes of the objects detected by the detector 112. However, the degree of approach may be calculated by using other methods. For example, based on a group of images taken in a most recent predetermined period of time, the outputter 113 may calculate the speed at which the distance between objects detected by the detector 112 in right images is shortened, the speed at which the distance between objects detected by the detector 112 in left images is shortened, and the speed at which the difference between parallaxes of objects detected by the detector 112 becomes smaller, and the outputter 113 may calculate the degree of approach based on these speeds. The outputter 113 may also calculate the degree of approach based on both these speeds and the distances and the difference between parallaxes according to the foregoing embodiment.

Figure 12:
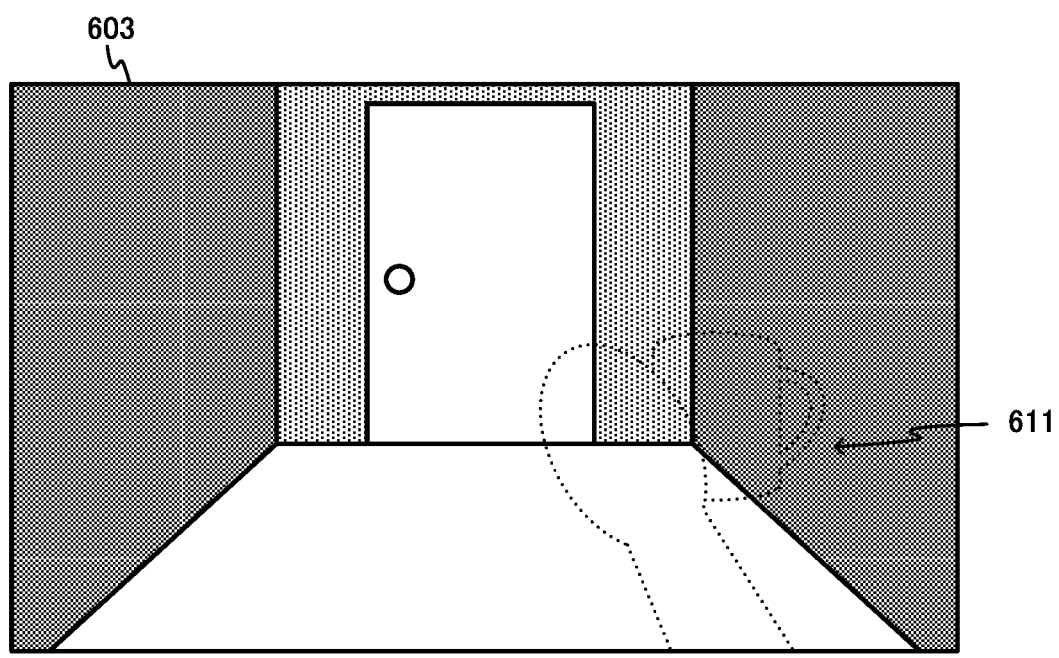
FIG. 12 is an image of the virtual space according to a modified example.

In the example described in the foregoing embodiment, when the calculated degree of approach is greater than a predetermined threshold, the outputter 113 determines that the objects detected by the detector 112 are likely to hit against each other and outputs an alert to the display 104. However, the outputter 113 may use any other mode of issuing an alert that reflects the degree of approach. For example, the outputter 113 may display an alert object in a more highlighted manner as the degree of approach is higher. As illustrated in FIG. 12, the outputter 113 may output an alert object 611 showing the contours of the objects approaching each other so as to be overlaid on the image of the virtual space. In an example, the detector 112 extracts an area having the pre-stored skin color and an area having the pre-stored color of the cup from a stereo image obtained by the obtainer 111, and identifies the objects corresponding to these areas as objects approaching each other. The outputter 113 then extracts a contour of the skin-colored area and a contour of the cup-colored area, processes the extracted contours into an alert object indicating the contours in a color suitable for the virtual space, in a broken line, or the like, and outputs the alert object to the display 104. In this way, the alerting apparatus 100 can alert the user that objects are likely to hit against each other in the real space without adversely affecting a sense of immersion of the user in the virtual space. The user can be aware that objects are going to hit against each other in the real space while wearing the head-mounted display that functions as the alerting apparatus 100.

The outputter 113 may not necessarily display an alert object at a position corresponding to the position of the objects approaching each other. For example, the outputter 113 may display an alert object near the center of the display 104. The outputter 113 may output an alert not only by showing an alert object on the display 104 but also by outputting an alert sound to a speaker (not illustrated).

The alerting apparatus 100 can be provided with a configuration in advance for implementing the functions according to the present disclosure. Alternatively, an existing apparatus such as a personal computer or an information terminal can be made to function as the alerting apparatus 100 according to the present disclosure by application of a program. In other words, by applying a program for implementing the individual functional components of the alerting apparatus 100 illustrated in the foregoing embodiment to an existing personal computer or information terminal device in such a way that the program can be executed by the CPU or the like that controls the existing personal computer or information terminal device, the personal computer or the information terminal device can function as the alerting apparatus 100 according to the present disclosure. A display method according to the present disclosure can be implemented by using the alerting apparatus 100.

In addition to the aforementioned method, the program can be applied by any appropriate method. For example, the program stored in a computer-readable recording medium (a compact disc read-only memory (CD-ROM), a digital versatile disc (DVD), a magneto-optical disc (MO), and so on) can be applied, or the program stored in a storage on a network such as the Internet can be downloaded to be applied.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure can provide an alerting apparatus, an alerting method, a program, and a non-transitory computer-readable information recording medium for alerting in advance that objects will hit against each other.

REFERENCE SIGNS LIST

100 Alerting apparatus
101 Controller
102 ROM
103 RAM
104 Display
105 Sensor
106 Operation device
107 Stereo camera
107a Right camera
107b Left camera
108 Bus
111 Obtainer
112 Detector
113 Outputter
200 Real space
300 User
400 Group of objects
401 to 405 Object
501R to 503R Right image
501L to 503L Left image
601 to 603 Image
610, 611 Alert object

The invention claimed is:

1. An alerting apparatus comprising:
at least one memory configured to store program code;
at least one processor configured to access the program code and operate as instructed by the program code, the program code including:
obtainer code configured to cause the at least one processor to obtain a group of images of a group of objects imaged by a stereo camera, the group of objects including a plurality of external objects;
detector code configured to cause the at least one processor to detect objects approaching each other in accordance with positions and parallaxes of the plurality of imaged objects based on the obtained group of images; and
outputter code configured to cause the at least one processor to output an alert relating to the detected objects,
wherein the detector code is configured to cause the at least one processor to extract a group of maintained objects that maintain relative positional relationships, in accordance with the positions and the parallaxes of the plurality of imaged objects, and
in the obtained group of images, when a backward object at least partially hidden by a frontward object that is not included in the extracted group of maintained objects is included in the extracted group of maintained objects, the detector code is configured to cause the at least one processor to determine whether the backward object and the frontward object are approaching each other, in accordance with the relative positional relationships.

2. The alerting apparatus according to claim 1, wherein the obtainer code is configured to cause the at least one processor to obtain the group of images including stereo images imaged by the stereo camera at a predetermined time interval,
the detector code is configured to cause the at least one processor to calculate, with respect to each of the stereo images included in the obtained group of images, distances among the plurality of objects and parallaxes of individual objects in the each of the stereo images, and
the detector code is configured to cause the at least one processor to detect objects approaching each other, based on temporal change in the calculated distances and parallaxes.

3. The alerting apparatus according to claim 1, wherein the alert represents contours of the detected objects to a display.

4. The alerting apparatus according to claim 1, wherein the outputter code is configured to cause the at least one processor to output an alert reflecting a degree of approach, the degree representing a degree of closeness between the detected objects.

5. A detecting apparatus comprising:
at least one memory configured to store program code; and
at least one processor configured to access the program code and operate as instructed by the program code, the program code including:
obtainer code configured to cause the at least one processor to obtain a group of images of a group of objects imaged by a stereo camera, the group of objects including a plurality of external objects; and
detector code configured to cause the at least one processor to detect objects approaching each other in accordance with positions and parallaxes of the plurality of imaged objects based on the obtained group of images,
wherein the detector code is configured to cause the at least one processor to extract a group of maintained objects that maintain relative positional relationships, in accordance with the positions and the parallaxes of the plurality of imaged objects, and
in the obtained group of images, when a backward object at least partially hidden by a frontward object that is not included in the extracted group of maintained objects is included in the extracted group of maintained objects, the detector code is configured to cause the at least one processor to determine whether the backward object and the frontward object are approaching each other, in accordance with the relative positional relationships.

6. An alerting method executed by an alerting apparatus having at least one processor, the method comprising:
obtaining a group of images of a group of objects imaged by a stereo camera, the group of objects including a plurality of external objects;
detecting objects approaching each other in accordance with positions and parallaxes of the plurality of imaged objects based on the obtained group of images; and
outputting an alert relating to the detected objects,
wherein the detecting the objects comprises:
extracting a group of maintained objects that maintain relative positional relationships, in accordance with the positions and the parallaxes of the plurality of imaged objects; and
in the obtained group of images, when a backward object at least partially hidden by a frontward object that is not included in the extracted group of maintained objects is included in the extracted group of maintained objects, determining whether the backward object and the frontward object are approaching each other, in accordance with the relative positional relationships.

7. A non-transitory computer-readable information recording medium storing a program causing a computer to:

obtain a group of images of a group of objects imaged by a stereo camera, the group of objects including a plurality of external objects;

detect objects approaching each other in accordance with positions and parallaxes of the plurality of imaged objects based on the obtained group of images; and output an alert relating to the detected objects, wherein the detecting the objects comprises:

extracting a group of maintained objects that maintain relative positional relationships, in accordance with the positions and the parallaxes of the plurality of imaged objects; and in the obtained group of images, when a backward object at least partially hidden by a frontward object that is not included in the extracted group of maintained objects is included in the extracted group of maintained objects, determining whether the backward object and the frontward object are approaching each other, in accordance with the relative positional relationships.

* * * * *